US011601300B2

(12) United States Patent
Pognant (10) Patent No.: US 11,601,300 B2
(45) Date of Patent: Mar. 7, 2023

(54) METHOD FOR INCIDENT MANAGEMENT OF A HOME AUTOMATION INSTALLATION (71) Applicant: OVERKIZ, Metz-Tessi (FR)

(72) Inventor: Sylvain Pognant, Seynod (FR)

(73) Assignee: SOMFY ACTIVITIES SA, Cluses (FR)

( * ) Notice: Subject to any disclaimer, the term of this patent is extended or adjusted under 35 U.S.C. 154(b) by 487 days.

(21) Appl. No.: 16/319,431

(22) PCT Filed: Jul. 20, 2017

(86) PCT No.: PCT/FR2017/051982
§ 371 (c)(1),
(2) Date: May 17, 2019

(87) PCT Pub. No.: WO2018/015671
PCT Pub. Date: Jan. 25, 2018

(65) Prior Publication Data
US 2019/0280891 A1    Sep. 12, 2019

(30) Foreign Application Priority Data

Jul. 22, 2016   (FR) ..................... 16/56995

(51) Int. Cl.
*G06F 15/16* (2006.01)
*H04L 12/28* (2006.01)
(Continued)

(52) U.S. Cl.
CPC ...... *H04L 12/2834* (2013.01); *G06F 11/0772* (2013.01); *H04L 12/2803* (2013.01);
(Continued)

(58) Field of Classification Search
CPC .............. G05B 15/02; G05B 2219/163; G05B 2219/2642; G06F 11/0772; H04L 12/2803;
(Continued)

(56) References Cited

U.S. PATENT DOCUMENTS 8,781,633 B2   7/2014  Fata et al.
9,152,737 B1   10/2015 Micali et al.
(Continued)

FOREIGN PATENT DOCUMENTS

WO    2015106766 A1    7/2015

OTHER PUBLICATIONS

International Search Report for Application No. PCT/FR2017/051982.
(Continued)

*Primary Examiner* — Normin Abedin
(74) *Attorney, Agent, or Firm* — Cantor Colburn LLP (57) ABSTRACT The present invention relates to a method for incident management of home automation equipment comprising at least one home automation device (D) and at least one central control unit (U), the method being implemented by a management unit (Sv) and comprising the following steps: a step (EDSv1) of receiving a diagnosis request concerning at least one central control unit (U) belonging to the home automation equipment or at least one home automation device belonging to the home automation equipment (St); a step (EDS3) of sending at least one diagnosis request message to the at least one central control unit (U) concerned by the diagnosis request or to the at least one central control unit (U) to which the at least one home automation device concerned by the diagnosis request is attached; a step (EDSv8) of receiving a diagnosis result coming from a central control unit (U); a step (EDSv9) of providing a
(Continued)

diagnosis report to the maintenance user (USAV), comprising: information concerning the communication between the management unit and the home automation device or the central control unit concerned by the diagnosis request, and/or, if the home automation device or the central control unit can communicate such a result: the last known values of the state variables for the home automation devices (D) and for the central control units (U); and/or the results of commands or connection attempts initiated by the end user (UsrF).

19 Claims, 5 Drawing Sheets (51) Int. Cl.
*G06F 11/07* (2006.01)
*H04L 67/125* (2022.01)
*H04L 12/46* (2006.01)
*G05B 15/02* (2006.01)

(52) U.S. Cl.
CPC ...... *H04L 12/2809* (2013.01); *H04L 12/4625* (2013.01); *H04L 67/125* (2013.01); *G05B 15/02* (2013.01); *G05B 2219/163* (2013.01); *G05B 2219/2642* (2013.01)

(58) Field of Classification Search
CPC ............. H04L 12/2809; H04L 12/2834; H04L 12/4625; H04L 67/125
See application file for complete search history.

(56) References Cited

U.S. PATENT DOCUMENTS

| | | | |
|---|---|---|---|
| 9,749,844 B1* | 8/2017 | Sovani | H04W 8/005 |
| 11,070,391 B2 | 7/2021 | Pognant | |
| 2005/0143671 A1 | 6/2005 | Hastings et al. | |
| 2005/0200474 A1 | 9/2005 | Behnke | |
| 2006/0238339 A1 | 10/2006 | Primm et al. | |
| 2008/0143517 A1 | 6/2008 | Goffin | |
| 2008/0281472 A1 | 11/2008 | Podgorny et al. | |
| 2009/0062964 A1 | 3/2009 | Sullivan et al. | |
| 2009/0113538 A1 | 4/2009 | Eom et al. | |
| 2010/0262467 A1* | 10/2010 | Barnhill, Jr. | H04L 41/12 709/223 |
| 2010/0274366 A1 | 10/2010 | Fata et al. | |
| 2011/0046792 A1 | 2/2011 | Imes et al. | |
| 2013/0231782 A1 | 9/2013 | Lee et al. | |
| 2014/0156081 A1 | 6/2014 | Ha | |
| 2014/0266671 A1 | 9/2014 | Huynh et al. | |
| 2014/0375440 A1 | 12/2014 | Rezvani et al. | |
| 2015/0054947 A1* | 2/2015 | Dawes | G08B 13/19682 348/143 |
| 2015/0106061 A1* | 4/2015 | Yang | G08C 17/00 702/188 |
| 2015/0127165 A1 | 5/2015 | Quam et al. | |
| 2015/0163412 A1 | 6/2015 | Holley et al. | |
| 2016/0017207 A1 | 1/2016 | Barnes et al. | |
| 2017/0039841 A1 | 2/2017 | Wilson et al. | |
| 2017/0084143 A1 | 3/2017 | Acera et al. | |
| 2017/0097619 A1* | 4/2017 | Welingkar | H04L 67/1095 |
| 2017/0191693 A1 | 7/2017 | Bruhn et al. | |
| 2020/0125056 A1 | 4/2020 | Pognant | |

OTHER PUBLICATIONS

Written Opinion for Application No. PCT/FR2017/051982.
International Search Report for Application No. PCT/FR2017/051980.
International Search Report for Application No. PCT/FR2017/051981.
U.S. Notice of Allowance; dated Mar. 18, 2021; U.S. Appl. No. 16/319,433; 7 Pages.
U.S. Final Office Action; dated Nov. 4, 2020; U.S. Appl. No. 16/319,433, filed Apr. 10, 2019; 19 pages.
U.S. Non-Final Office Action; dated May 29, 2020; U.S. Appl. No. 16/319,433, filed Apr. 10, 2019; 20 pages.
U.S. NonFinal Office Action; dated Oct. 4, 2021; U.S. Appl. No. 16/319,437, filed Aug. 30, 2019; 54 Pages.
Written Opinion for Application No. PCT/FR2017/051980.
Written Opinion for Application No. PCT/FR2017/051981.
U.S. Final Office Action; dated May 10, 2022; U.S. Appl. No. 16/319,437, filed Aug. 30, 2019; 64 Pages.

\* cited by examiner

METHOD FOR INCIDENT MANAGEMENT OF A HOME AUTOMATION INSTALLATION

CROSS REFERENCE TO RELATED APPLICATIONS

This application is a National Stage of PCT Application No. PCT/FR2017/051982 filed on Jul. 20, 2017, which claims priority to French Patent Application No. 16/56995 filed on Jul. 22, 2016, the contents each of which are incorporated herein by reference thereto.

FIELD OF THE INVENTION

The present invention concerns a method for managing an incident in a home automation installation.

PRIOR ART

A home automation installation of a building may comprise a plurality of home automation devices. It is known to proceed with the configuration, and the monitoring, that is to say the control and/or the supervision of said installation by using a central control unit which communicates with one or several home automation device(s).

By nature, such a home automation installation is a heterogeneous environment. During an incident on the installation, corresponding for example to the observation of a defect by the end user or a malfunction, it may turn out to be difficult for a maintenance operator or user, in particular for remote maintenance, to identify the source of the defect or malfunction between the different elements composing the installation.

The present invention aims at solving all or part of the above-mentioned drawbacks.

DISCLOSURE OF THE INVENTION

To this end, the present invention concerns a method for managing an incident of a home automation installation comprising at least one home automation device and at least one central control unit, the method being implemented by a management unit and comprising the following steps:
  A step of receiving a diagnosis request concerning at least one central control unit belonging to the home automation installation or at least one home automation device belonging to the home automation installation;
  A step of sending at least one diagnosis query message to the at least one central control unit concerned by the diagnosis request or to the at least one central control unit to which the at least one home automation device concerned by the diagnosis request is related;
  A step of receiving a diagnosis result coming from a central control unit;
  A step of providing a diagnosis report to the maintenance user, the diagnosis report being established based on the at least one diagnosis result;
  The at least one diagnosis result comprising:
  at least one information concerning the communication between the management unit and the home automation device or the central control unit concerned by the diagnosis request, and/or
  to the extent that the home automation device or the central control unit can communicate such a result:
  at least one known value of at least one state variable of the at least one home automation device and/or of the at least one central control unit; and/or at least one control or connection attempt result at the initiative of the end user.

Thanks to the arrangements according to the invention, the set-up of the incident management is facilitated by allowing proceeding with remote checks by the maintenance users on the central control units and/or the home automation devices.

According to an aspect of the invention, the management unit is a server remotely connected to the at least one home automation installation, via a wide area network. It should be noted that the term server is a logical designation which may cover the use of several physical servers to distribute the computer processing load to be carried out.

According to another aspect of the invention, the management unit is a central unit intended to be connected to one or several central control unit(s) on distinct private or local area networks, or else on the same local area network.

In the context of the invention, a maintenance user or a support user is a user in charge of responding to the calls or the queries from the end users, these queries may be punctual queries or in the form of a subscription for monitoring the installation, in particular within a call center. It may be in particular a first-level maintenance user.

In the context of the present invention, a home automation device is a home automation equipment and/or a sensor, or else a home automation equipment portion or a sensor portion corresponding to a functional subset. A home automation device may also correspond to a control point of other home automation devices.

In the context of the present invention, a home automation devices type corresponds to a category of devices which are identical, similar or sharing features and at least one definition of a state variable. As example, a type may correspond to a particular model of rolling shutter, alarm or gate.

In the context of the present invention, a message is an information element notified or received via a communication module from an external equipment, or in the form of a synchronous or asynchronous call, which may also correspond to a local or remote function call.

In the context of the present invention, an installation is a set comprising a plurality of home automation devices and at least one central control unit disposed in a single building or on a plurality of locations, each home automation device being connected to a central control unit among the plurality of central control units, the plurality of central control units forming a group monitored by a user. The electronic devices form groups of at least one home automation device related to a central control unit.

In the context of the present invention, a central control unit of the home automation installation is an electronic unit comprising:
  at least one processing unit for containing and executing at least one computer program,
  at least one communication module intended to monitor and/or control at least one home automation device; and
  at least one module for communication with the management unit.

The electronic unit may be independent or integrated into a home automation device. In the latter case, the communication module intended to monitor and/or control the device may be a communication module internal to the home automation device and/or a communication module intended to monitor and/or control other home automation devices. In some applications, a central control unit may communicate with the management unit through an intermediate management unit, for example of a third-party service provider, whose intermediate management unit provides a service interface or API.

The central control unit may also be integrated into a router and/or a modem achieving a connection to a wide area network, in particular to Internet.

In the context of the present invention, a state variable is a descriptive element of the state of a home automation device. The value of a state variable may correspond to the switching on or off for a switch, or to a degree or percentage of opening for a shutter.

A state variable may also correspond to a quantity indicative of the operation of a home automation device. As example, such a state variable may correspond to:
 a battery or cell level indicator,
 a safety indicator, for example for a terrace blind-type device due to a gust of wind, or else
 an ignition incident indicator, for example for a boiler-type home automation device.

The state variables may also comprise software update version values and indications on the update result.

Moreover, a state variable may correspond to a measurement value of a sensor, for example to a value of a physical or environment quantity. The description of the states of the devices can be generic or specialized, depending on the local protocol. The identifiers of the state variables can be numeric or alphanumeric. The values of the state variables can use customized or proprietary formats or scales.

In the context of the present invention, a command corresponds to an order which can be given to a home automation device in order to carry out an action by this device or to obtain an information in return, for example an information relating to a state variable of this device.

According to an aspect of the invention, the at least one information concerning the communication between the management unit and the home automation device or the central control unit concerned by the diagnosis request can comprise an indication of a failure or an absence of communication or alternatively a success or an existence of said communication.

According to an aspect of the invention, the at least one information concerning the communication between the management unit and the home automation device or the central control unit concerned by the diagnosis request may comprise:
 an indication of the quality of the transmission between the elements and/or
 an indication of the possible intervals without communication.

According to an aspect of the invention, the at least one known value of the state variables may comprise a set of the last known values of the state variables for the home automation devices and/or for the central control units.

In particular, this set may comprise a history of updates of the embedded software/indicating whether these updates were performed correctly.

According to an aspect of the invention, the controls or connection attempts results at the initiative of the end user comprise:
 A history of connection incidents; for example, connection difficulties of the user which can correspond to failed attempts to enter a login/password, and/or
 A history of the actions by the end user UsrF, or by an automatism, with an execution result/The last observed defects, and/or
 A history of events on the management unit.

According to an aspect of the invention, the diagnosis report may comprise:
 An analysis of the history and/or
 A proposal for a resolution procedure.

According to an aspect of the invention, the method comprises a step of creating an incident ticket, and the diagnosis report is established in connection with the incident ticket during the step of providing a diagnosis report to the maintenance user.

According to an aspect of the invention, the method comprises a prior step of receiving an incident management request from an end user of the installation or from a user of a maintenance center.

According to an aspect of the invention, the method comprises a step of determining a user profile corresponding to the end user.

According to an aspect of the invention, the method comprises a step of determining a home automation installation and/or a central unit or at least one home automation device related to the user profile corresponding to the end user.

According to an aspect of the invention, the method comprises a step of checking the access rights of a maintenance user on the installation, the central unit or the device.

According to an aspect of the invention, the method comprises a step of sending a request for authorization of temporary access right to the installation, to the central control unit or to the home automation device to the end user for the benefit of the management unit or the maintenance user, and a step of receiving a response to the request for authorization of access right.

According to an aspect of the invention, the method further comprises carrying out a step of local diagnosis on the management unit.

According to an aspect of the invention, the step of providing a diagnosis report comprises carrying out a combination between a result of the local diagnosis step and the diagnosis result coming from the central control unit.

According to an aspect of the invention, the method comprises a step of sending an ascending message to an expert maintenance user.

According to an aspect of the invention, the method comprises:
 a step of receiving a control request concerning at least one central control unit belonging to the home automation installation or at least one home automation device belonging to the home automation installation;
 a step of local test based on the information available at the level of the management unit;
 a step of sending at least one control request message to the at least one central control unit concerned by the control request or to the at least one central control unit to which the at least one home automation device concerned by the control request is related;
 a step of receiving a control result coming from a central control unit;
 a step of providing a control report, in connection with an incident ticket to the maintenance user established based on the at least one control result.

According to an aspect of the invention, the method further comprises carrying out a step of local control on the management unit.

According to an aspect of the invention, the control corresponds to the update of a software embedded on the home automation device or the central control unit concerned by the control request.

According to an aspect of the invention, the method comprises:
- a step of determining a third-party system associated to the incident management of a central control unit or a home automation device concerned by the incident management request;
- a step of sending a query for opening a third-party ticket by said third-party system;

In the context of the present invention, a third-party system corresponds to an incident management system belonging to manufacturers or to companies ensuring the maintenance of home automation devices or central control units. The interaction between the management unit and a third-party system allows delegating all or part of the management of an incident relating to a home automation device or to a central control unit to said third-party system, in particular in the case where it consists of a device or unit which is commercialized or maintained by the company in charge of the third-party system.

According to an aspect of the invention, the method comprises:
- A step of receiving a feedback concerning the third-party ticket.

According to an aspect of the invention, the method comprises at least one step of receiving an intermediate status relating to the third-party ticket coming from the third-party system.

According to an aspect of the invention, the closure of the ticket can intervene if the feedback concerning the third-party ticket indicates a resolution.

The present invention also concerns a method for incident management of a home automation installation comprising at least one home automation device and at least one central control unit, the method being implemented by a central control unit and comprising the following steps:
- A step of receiving a diagnosis request concerning the central control unit or at least one home automation device related to the central control unit;
- A step of sending at least one diagnosis query message to the at least one home automation device concerned by the diagnosis request.
- A step of receiving a diagnosis result coming from a central control unit;
- A step of providing a diagnosis report;

The present invention also concerns a method for incident management of a home automation system comprising at least one home automation device and at least one central control unit, the method being implemented by a central control unit and comprising the following steps:
- A step of receiving a control request concerning the at least one central control unit or at least one home automation device related to the central control unit;
- A step of sending at least one control query message to the at least one home automation device concerned by the diagnosis request.
- A step of receiving a control result coming from a central control unit;
- A step of providing a control report;

The different aspects defined above which are not incompatible can be combined.

BRIEF DESCRIPTION OF THE FIGURES

The invention will be better understood using the detailed description which is exposed below with reference to the appended drawing in which.

DESCRIPTION WITH REFERENCE TO THE FIGURES

In the following detailed description of the figures defined above, the same elements or the elements fulfilling identical functions might retain the same references so as to simplify the understanding of the invention.

Description of a System Comprising a Home Automation Installation

Figure 1:
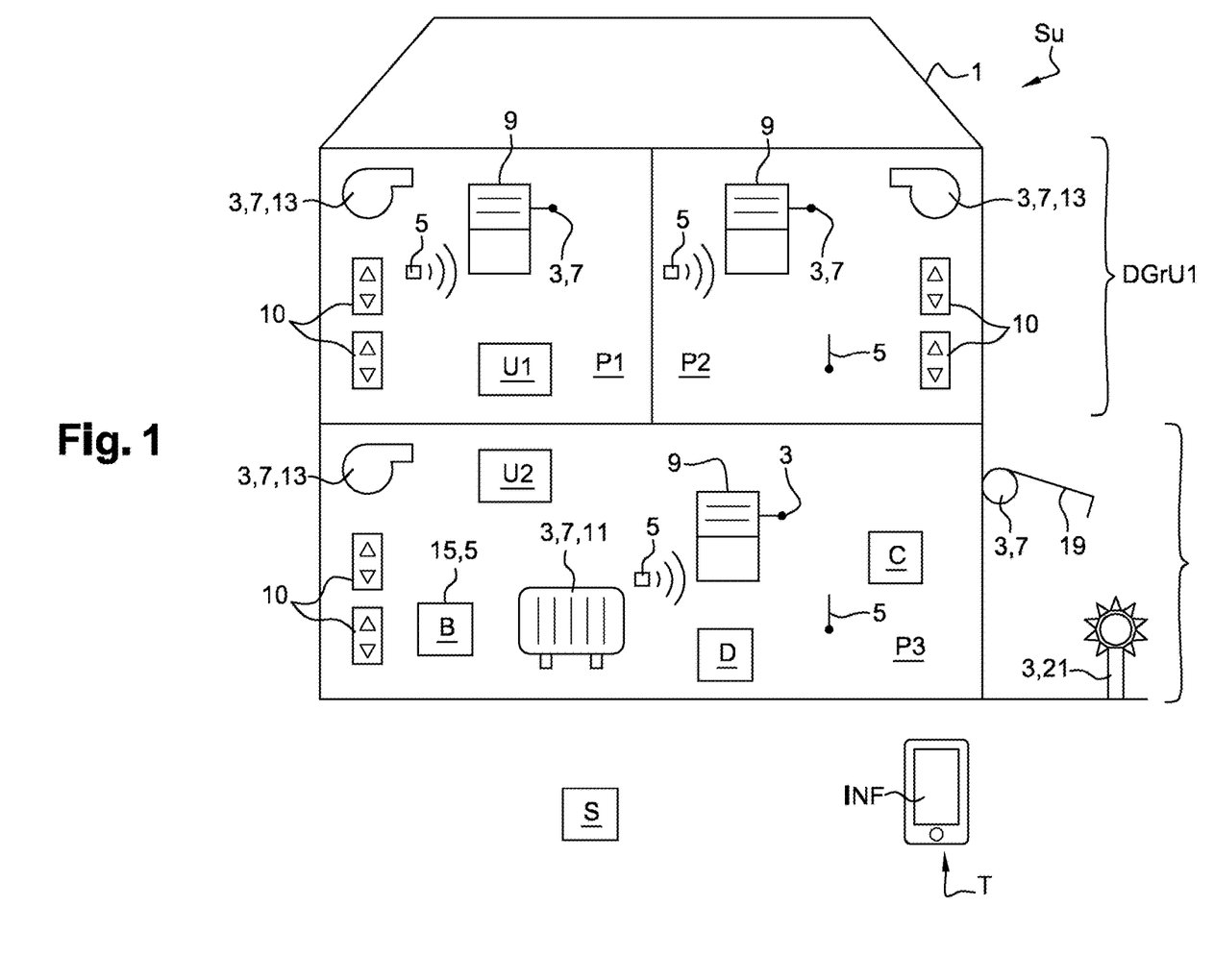
FIG. 1 is a schematic view of a building and a home automation installation in accordance with an embodiment of the invention.

As illustrated in FIG. 1, a building 1 comprises, as example, three rooms P1, P2, P3. The building 1 also comprises home automation equipment 3 and sensors 5.

A home automation equipment 3 may be an actuator arranged to displace or adjust a building element 1, for example an actuator 7 to displace a rolling shutter 9 or a terrace blind 19, or a regulation system 10 for a heater 11 or an aeraulic system 13. A home automation equipment 3 may also be a lighting, for example a terrace outdoor lighting 21 or a lighting control system, an alarm system, or else a video camera, in particular a video-surveillance camera.

The home automation installation Su may also comprise a control point 15 of an actuator 7, such as a wireless control case B for the rolling shutter 9.

The home automation installation Su may comprise one or several sensor(s) 5, integrated with an actuator 7, a control point 15 or else the control case B, or independent of these elements. A sensor 5 may, in particular, be arranged to measure a physical quantity, for example a temperature sensor, a sun lighting sensor or a humidity sensor. Position sensors 5 of home automation equipment 3 of the building 1, such as, for example, sensors of the open state of a rolling shutter 9 or position sensors of a door leaf such as a window, whether motorized or not, can also be provided. The home automation installation may also comprise one or several presence sensor(s).

A home automation equipment 3 and a sensor 5 are thus to be considered as units having available information on observed actual states of elements of the building 1 and being able to share this information with other elements of the home automation installation Su.

The home automation equipment 3 and the sensors 5 may thus have access to any measurable physical quantity, such as the temperature of each room P1, P2, P3 or a state of an element of the building 1, such as the opening state of a rolling shutter 9, the status of an alarm, etc.

Subsequently, we will use the designation of home automation device or device D indifferently to designate sensors or home automation equipment, or else portions of home automation equipment 3 or sensors 5.

Home automation devices generally comprise a processing unit comprising a processor executing an embedded software. This software is updated in order to improve the functions or proceed with corrections.

The home automation installation Su comprises a central control unit or a plurality of central control units U1, U2. In particular and as example, two central control units U1, U2 are represented in FIG. 1. According to a variant, a home automation installation may also comprise one single central control unit.

Each central control unit U1, U2 is arranged to control and/or monitor a portion of the devices D of the installation Su forming a group DGrU1, DGrU2. As example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the external devices.

In particular, the control and/or the monitoring is carried out remotely, in particular by using a wireless communication protocol, for example a radio communication protocol. Each central control unit U1, U2 is arranged to group all data coming from the devices D of the group DGrU1, DGrU2 thereof and to process these data.

Figure 2:
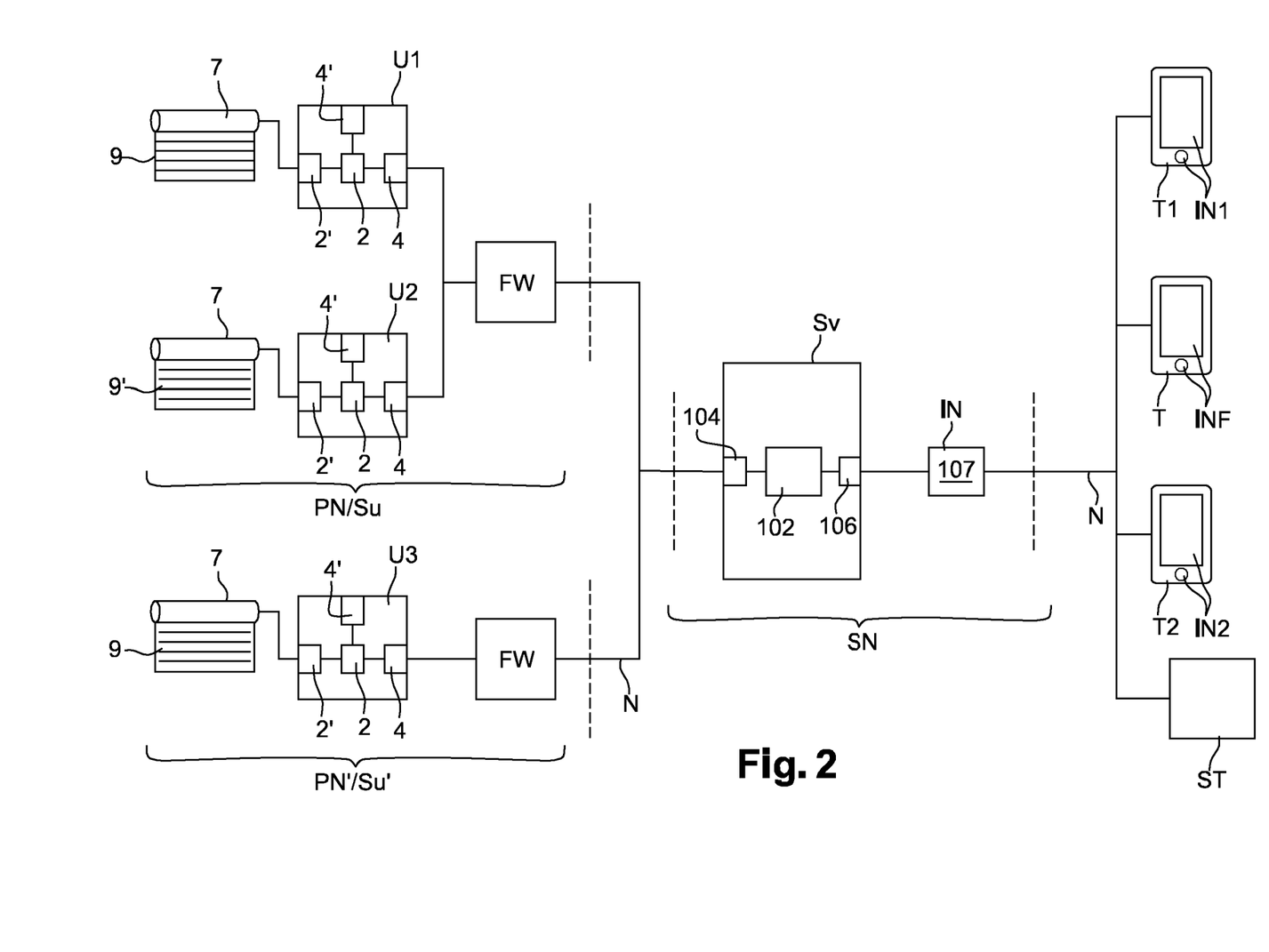
FIG. 2 is a diagram showing an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, while a third central control unit U3 is disposed on a second private network PN', independent of the private network PN corresponding to a second home automation installation Su'. The server Sv is also disposed on a private network SN. The private network PN is connected to a wide area network N, for example Internet. Of course, the server Sv is arranged to communicate with a set of such central control units U. We will describe one of these units later.

A central control unit U comprises a processing unit 2 arranged to contain and execute a first computer program. As example, the processing unit 2 comprises a processor, a storage flash memory as well as a random access memory, and an Ethernet chip.

The processing unit executes an embedded software. This software is updated in order to improve the functions or proceed with corrections.

The central control unit U further comprises at least one communication module 2' intended for the control and/or the monitoring of home automation equipment 3 and/or sensors 5, the home automation equipment 3 might be actuators 7, lightings 21, an alarm system, or a video camera.

As example, as represented in FIG. 2, the communication module 2' allows the monitoring and the control of at least one actuator 7, of a movable element of the building 1, such as for example a roller shutter 9, or an orientable sunshade 9' or other actuators 7 or lightings 21, as previously described with reference to FIG. 1, according to the first local communication protocol P1.

As example, the communication module 2' may be arranged to implement for example one or more of the first local protocols P1, such as for example Z-Wave, EnOcean, IO Homecontrol, Somfy RTS, KNX, MODBUS, Wavenis, Philips HUE. In general, these first local protocols are non-IP local communication protocols.

According to another possibility, for example in the context of alarm systems, the central control unit may be integrated in the home automation device. According to yet another possibility, the central control unit may be integrated with a router and/or a modem achieving a connection to a wide area network, in particular to Internet.

In the case where the central control unit is integrated with a home automation device, the communication module 2' intended for the monitoring and/or the control of the device can be a communication module internal to the home automation device and/or a communication module intended for the monitoring and/or the control of other home automation devices.

The reception of information from a sensor 5 providing information on the presence of a user or values of the surrounding parameters, such as the temperature, the humidity and the brightness, is also provided. In the same manner, the central unit U may allow the monitoring and/or the control of an alarm system.

Each central control unit U may further comprise a communication module 4' for communicating according to a second target communication protocol P2, with a mobile communication terminal T. The second target communication protocol may for example be a communication protocol above the protocol IP on a local area network, or else a point-to-point generic protocol. As example, the application protocol WEAVE using 6lowpan and thread transport protocols for a mesh network may constitute a second target protocol. Other examples include Bluetooth, Zigbee or Wifi.

The communication terminal T may contain and execute an application software APP.

Each central control unit U further comprises a module 4 for communication with the server Sv. The server Sv allows the remote control and/or monitoring and comprises one or several processing unit(s) 102 arranged to contain and execute a second computer program.

In some applications, a central control unit U may communicate with the server Sv through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface INF enabling a user to remotely monitor the home automation installation.

It should be noted that the term server is a logical designation which may cover the use of several physical servers to distribute the computer processing load to be carried out.

The control and/or monitoring interface IN comprises, for example, a web server 107 and a mobile communication terminal T communicating by the wide area network N. The mobile communication terminal T may be, for example, a smartphone or a tablet. The mobile communication terminal T may be the same or a terminal of the same type as that with which the central control unit U locally communicates by means of the communication module 4', or a different terminal. We will indifferently designate these mobile terminals by the reference T.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a touch control portion of a screen of the terminal T and in the form of one or several button(s) of the terminal T.

Unique Identifier of a Home Automation Device

The server Sv and the central control units U can use a unique identifier to identify the home automation devices.

The structure of a unique identifier of a home automation device DURL will now be described correspondingly to a particular embodiment.

According to this embodiment, the unique identifier of a home automation device comprises information on:
- The local native protocol of the home automation device ID,
- The communication path to the device D, including the intermediate central control units U and the end addresses to be crossed, whether organized or not in a hierarchical topology;
- A subsystem identifier subsystemId if the device belongs to a group of devices D associated to the same address. The devices which have a unique expression of an address do not have an identification extension of a subsystem.

Thus, the form of the unique identifier of a device DURL may be as follows:

<protocol>://<gatewayId>krawDeviceAddress>(#<subsystemId>)

In which the following fields are present:
protocol: identifier of the native device local protocol;
gatewayId: identifier of the first central control unit U, for example a serial number or a unique identifier.
rawDeviceAddress: a simple or several-level path. Its meaning and format depend on the addressing scheme of the local communication protocol of the device D.
subsystemId: this optional field indicates an identification, for example a row of the subsystem (starting for example at 1), if such a subsystem is present.

EXAMPLES 1) knx://0201-0001-1234/1.1.3

This unique identifier DURL corresponds to a device D communicating by the protocol KNX with an individual address 1.1.3 accessible by the central control unit U bearing the identifier #0201-0001-1234.

2) io://0201-0001-1234/145036#2

This unique identifier GDURL corresponds to a subsystem bearing No. 2 associated to a device D communicating by the protocol io homecontrol with a radio address 145036 accessible by the central control unit U bearing the identifier #0201-0001-1234.

Maintenance Users and Expert Maintenance Users

As represented in FIG. 2, the server Sv can communicate with terminals in the possession of users who are not the end user(s) of the installation Su.

In particular, the server Sv can interact with at least one first user USAV having a user profile of a first type USAVT1. The first user type USAV corresponds to a remote maintenance operator or user, in particular a first-level maintenance user in charge of responding to calls or requests from end users UsrF.

To this end, an interface IN1 is made available by the server Sv. Access to this interface may be carried out by an application executed on a user terminal T1 of the first user USAV, or by an access by a light client.

The server Sv can also interact with at least one second user USAVex having a user profile of a second type USAVex T2. The second type of user USAVex corresponds in particular to an expert or second-level maintenance user, which has, for example, technical skills superior to those of a first-level maintenance user USAV.

To this end, an interface IN2 is made available by the server Sv. Access to this interface may be carried out by an application executed on a user terminal T2 of the second user, or by an access by a light client.

Third-Party Systems

As shown in FIG. 2, the server Sv can interact with third-party systems ST. In particular, it is possible to consider that the third-party systems correspond to incident management systems belonging to manufacturers or to companies ensuring maintenance of home automation devices or central control units. The interaction between the server Sv and a third-party system allows delegating all or part of the management of an incident relating to a home automation device or to a central control unit to said third-party system, in particular in the case where it consists of a device or a unit which is commercialized or maintained by the company in charge of the third-party system.

Incident Management Method

Figure 3:
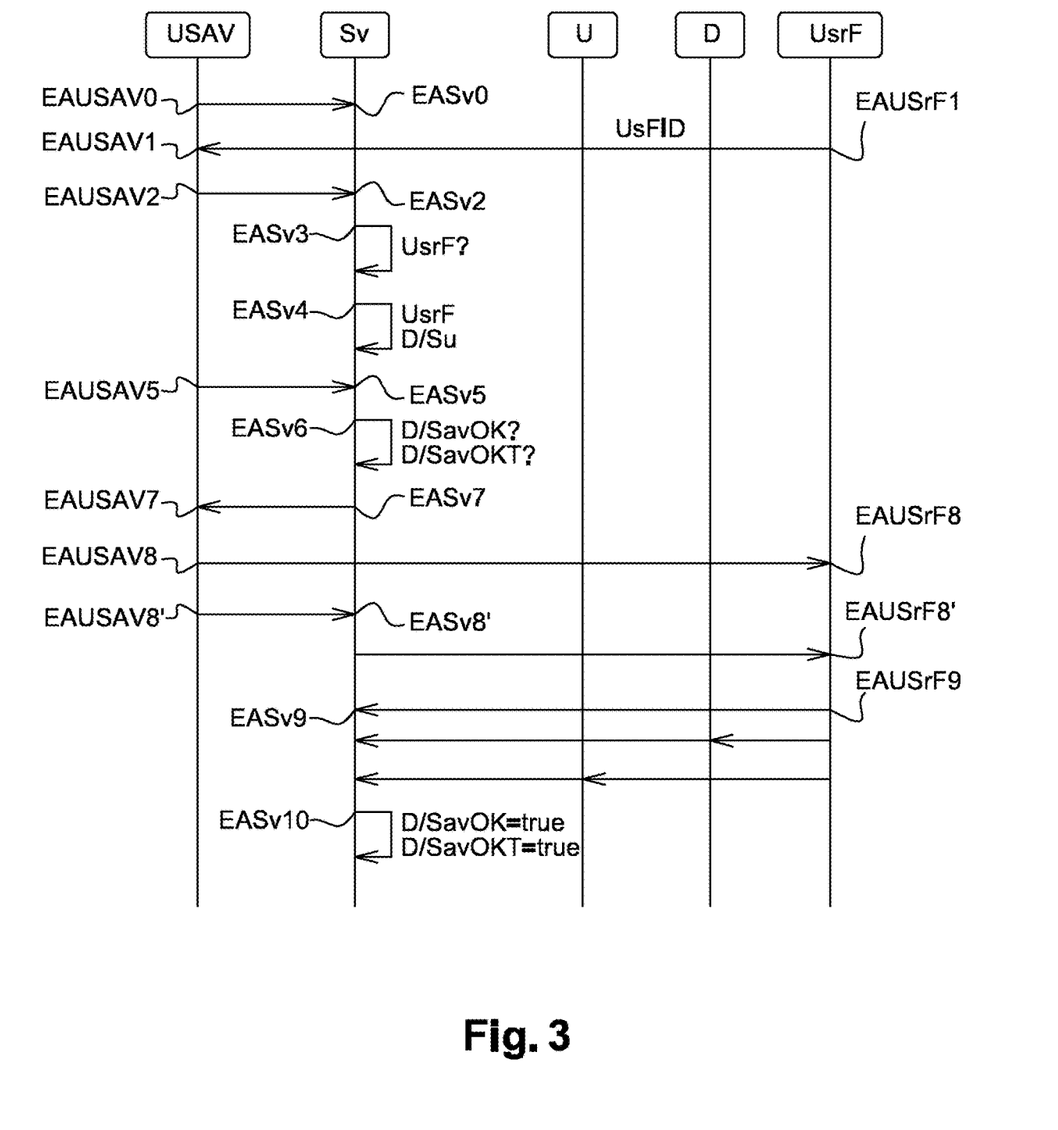
FIGS. 3 to 5 are diagrams illustrating an implementation of a method for incident management of a home automation installation according to the invention.
Figure 4:
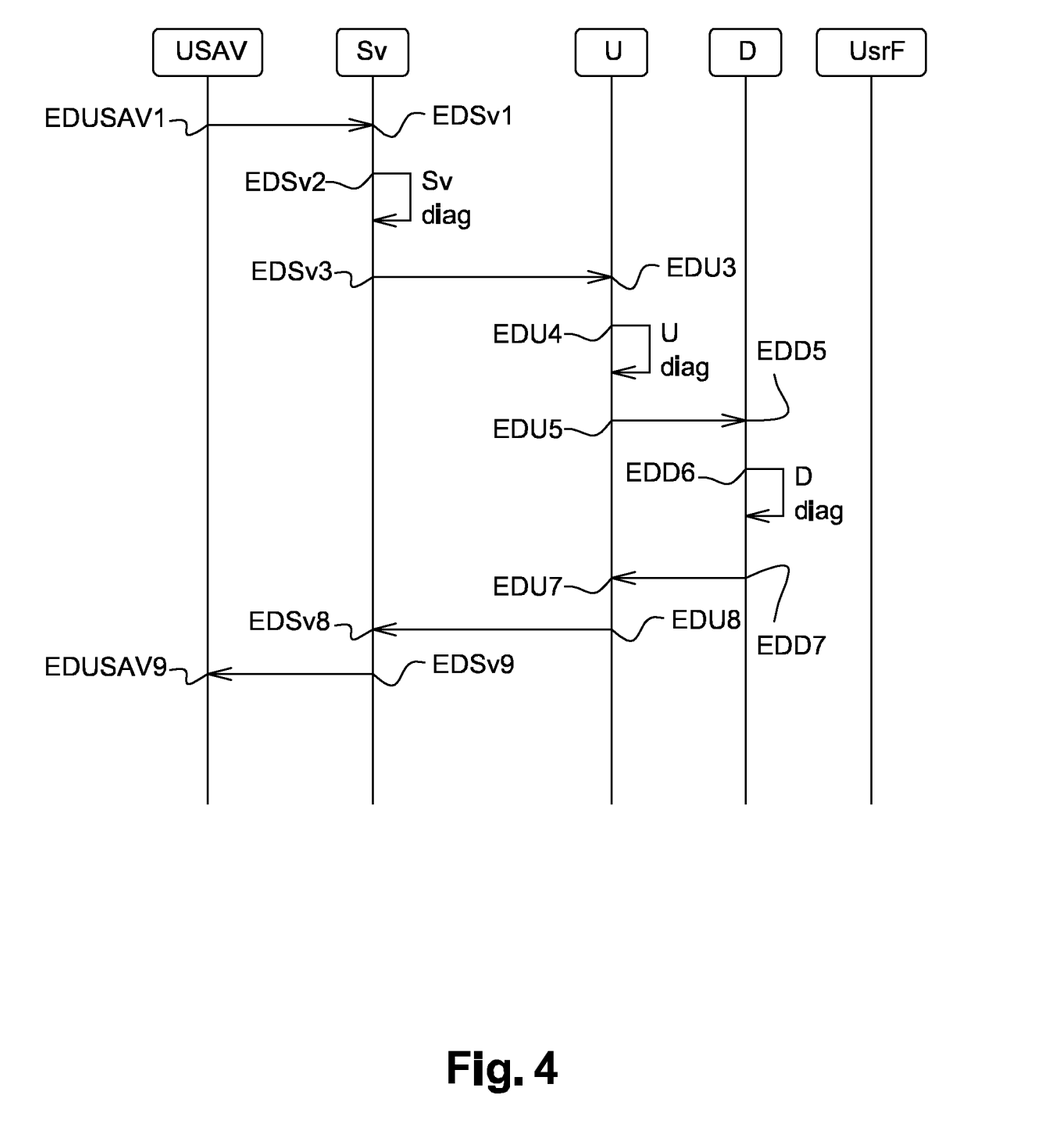
Figure 5:
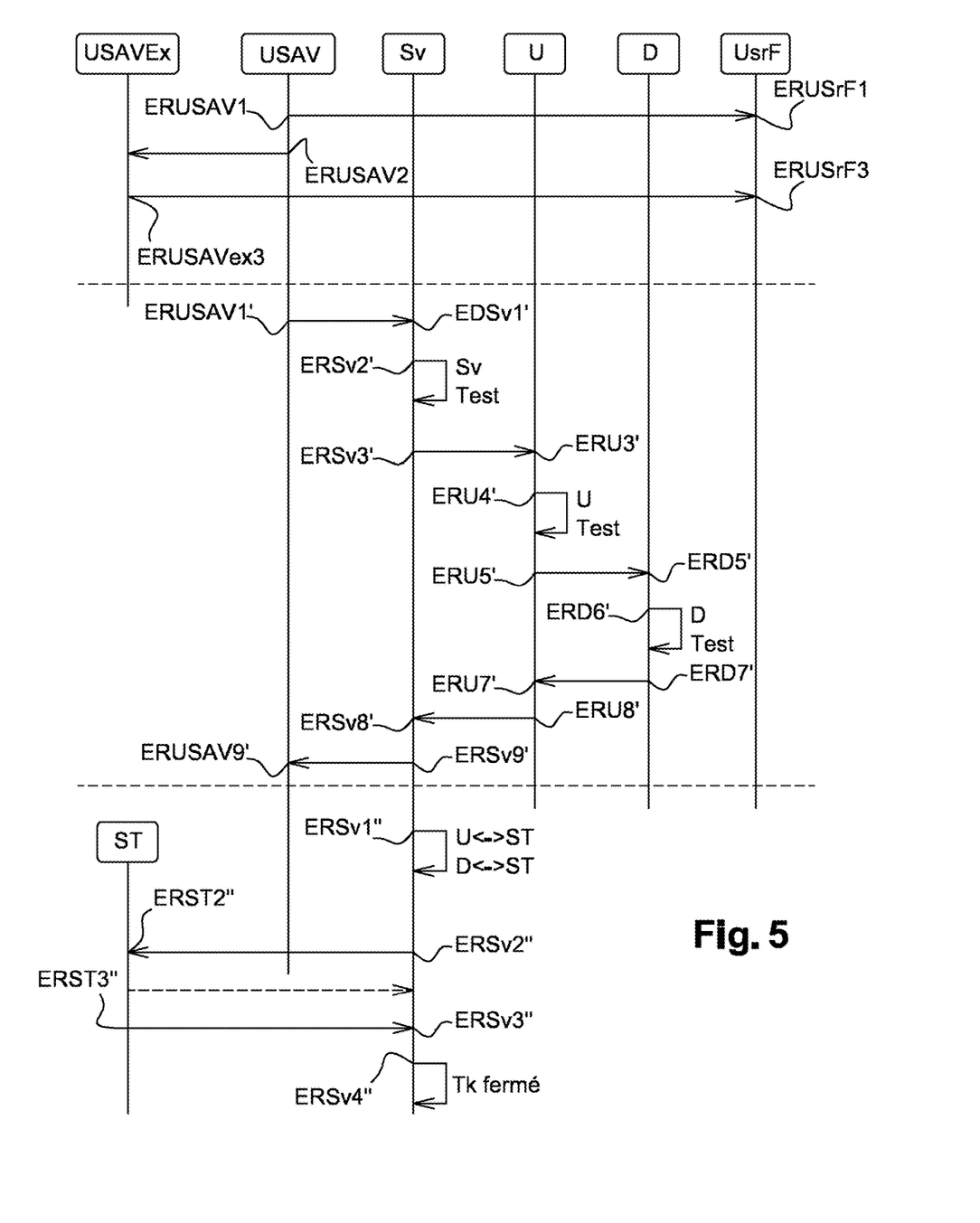

We will now describe an implementation of an incident management method with reference to FIGS. 3 to 5, these figures corresponding to three phases of the method.

Creation of the Ticket and Temporary Access Authorization for the Maintenance

At a previous step EAUSAVO/EASv0 a maintenance user account is created by the user USAV with the management unit Sv.

At a step EAUsrF1, an end user UsrF places a call corresponding to an incident management query with a call center, the call being followed by a remote maintenance user USAV having a terminal T1 for access to the management unit Sv.

Alternatively, the incident management query can be communicated by Email/Chat/Interface Message on the central control unit U (e.g.: Tahoma) or else by a smartphone application.

An end user identifier UsrFID should be communicated.

At a step EASv2, the management unit is notified of this call, automatically or in a solicited manner by the maintenance user (at a step EAUSAV2). The creation of a ticket Tk can be carried out at this stage, in connection with the end user identifier UsrFID.

At a step EASv3, the management unit proceeds with at least one existence check of an account for the end user.

At a step EASv4, the management unit determines the installation Su and/or the home automation device list D associated to the profile of the end user UsrF.

At a step EASv5, the management unit receives an information query coming from the user USAV to obtain information. Alternatively, the management unit may consider this implicit query as long as an incident management query has been initiated.

At a step EASv6, the management unit checks whether an access is authorized for the maintenance user USAV on D by checking in particular whether a corresponding «flag» SAVOK has a «true» Boolean value and/or whether the validity range of the authorization SAVOKT is still valid for an installation Su, a central control unit U or a device D.

If the result of the test is negative, an access refusal response is given to the maintenance user USAV at a step EASv7.

We will assume in the case described in FIG. 3 that the response is negative.

In this case, the maintenance user USAV may request:
directly by telephone to the user or by another means (Chat, . . . ) to grant him access to the system at a step USAV8.

or indirectly via the management unit at a step USAV8'

In response, the end user UsrF gives his authorization to the server through a user interface of the central control unit U, the chat application or an element of a device as shown by step EAUSrF9.

Upon receipt of this authorization, the management unit Sv can update the Flag SAVOK or the validity period SAVOKT at a step EASv10.

Thus, a temporary right on an installation Su, a central unit U or a device D is granted to the maintenance user USAV for carrying out consultations and/or a test as will be described later.

In practice, the granted rights allow consulting the following elements on a device:
- The address thereof;
- The list of the devices of an installation Su;
- The values of the state variables of the home automation devices D;
- The diagnosis results
- The possibility of carrying out test functions The rights of the maintenance user USAV are more limited than those of the end user USrF.

Test/Diagnosis

At a first step EDUSAV1, the maintenance user USAV requests a consultation of the installation, a central control unit or a home automation device D for which he has a temporary authorization.

This request is received by the management unit Sv at a step EDSv1.

This part of the method is implemented based on an architecture comprising a set of communicating elements, namely: the management unit Sv, the central control units U, the home automation devices D which form different levels. During a consultation of a user relating to a device D, a communication chain must be established throughout these different levels until reaching the device D.

At each level, the diagnosis may comprise a first step of checking the communication between the current element and the next element of the chain. The described architecture may comprise three levels: a level corresponding to the management unit Sv, a level corresponding to a central control unit U, and a level corresponding to a home automation device D. Of course, it is possible that intermediate levels intervene, for example in the context of a Mesh type communication, for example because of a communication by an intermediate management unit. The central control unit may also be integrated into a home automation device, which can reduce the number of network communication levels.

In the case where the communication is possible, a remote or «active» diagnosis is carried out. In the opposite case, a «passive» diagnosis based on the information possibly stored in the current element is carried out.

We will describe the different diagnosis steps at the different levels of the architecture comprising the home automation installations Su and the management unit Sv.

The management unit initiates a first diagnosis step EDSv2 based on the information available at its level. For example: What is the state of the network connection to the installation comprising the home automation device concerned by the consultation request, and in particular to the central control unit to which the device D is related? Is there a last state stored on the management unit.

In the case where the network connection or the communication is possible to the central control unit U to which the device D is related, the management unit Sv can also send, at a step EDSv3, a diagnosis request message to a central control unit U, that the central control unit receives at a step EDU3.

The central control unit U launches a diagnosis step EDU4 based on the information available at its level. For example: What is the state of the network connection to the devices? Is there a last state stored on the central control unit.

According to a first possibility, the central control unit U has an automatic diagnosis function or procedure. In this case, the sending of the diagnosis message by the management unit Sv corresponds to a call to said function or procedure.

The function or procedure can thus return codes and/or error messages, or else generate a diagnosis report specific to the central control unit which can be remotely consulted by the management unit or communicated thereto.

The central control unit can for example determine:
- whether its system parameters are correct (use rate of the memory, the processor, . . . ),
- whether one of the software processes that it executes is unexpectedly stopped;
- whether its clock is well synchronized with a time management server.
- in the case where it supports several communication channels with the server, whether all these channels work (e.g.: GSM).

The central control unit may also or alternatively have state variables being useful to the diagnosis which can be remotely consulted by the management unit or which are automatically communicated to the management unit in a periodic manner.

According to a second possibility, for example in the case where the central control unit has neither function nor state variable for the diagnosis, the management unit carries out the diagnosis procedure using the functions available on the central control unit U.

The management unit is therefore configured to store the description of the procedure to be performed.

A diagnosis procedure typically consists of a set of commands to be performed in a predetermined order, but may also be expressed in the form of a script for a command language supported by the unit that will execute this procedure.

The errors possibly encountered while carrying out the test procedure will serve as a basis for the diagnosis report.

The central control unit Sv can also send, at a step EDU5, a diagnosis request message to a device D, that the device D receives at a step EDD5.

The home automation device D launches a diagnosis step EDD6 based on the information available at its level. For example: What are the values of the variables of the device? Is the device in a Thermal Protection state?

According to a first possibility, the home automation device D has an automatic diagnosis function or procedure. In this case, the sending of the diagnosis message by the control unit U corresponds to a call to said function or procedure.

The function or procedure can thus return codes and/or error messages, or else generate a diagnosis report specific to the home automation device which can be remotely consulted by the central control unit U or communicated thereto.

As example, the central control unit U may request a home automation device D of the heating system type to be self-diagnosed if the latter supports this function. The heating system might then monitor the values of its inner temperature sensors and identify possible defects.

The home automation device D may also or alternatively have state variables being useful to the diagnosis which can be remotely consulted by the central control unit U or which are automatically communicated to the central control unit in a periodic manner.

As exemple:
- a sensor-type home automation device may have a state variable of the «low battery» type;
- a terrace blind-type home automation device may have a state variable of the «safety mode due to wind gusts» type;
- a boiler-type home automation device may have a state variable of the «observed misfires» type;

The diagnosis can be performed from the point of view of the central control unit actively by requesting a reading of these states or passively by consulting the latest received values.

According to a second possibility, for example in the case where the home automation device has neither a function nor a state variable for the diagnosis, the central control unit carries out the diagnosis procedure using the functions available on the home automation device D.

The central control unit U is therefore configured to store the description of the procedure to be performed, this description being obtainable from the management unit at a prior step.

A diagnosis procedure typically consists of a set of commands to be performed in a predetermined order, but may also be expressed in the form of a script for a control language supported by the unit that will execute this procedure.

As example, the management unit can send in the context of step EDSv3 a request to the central control unit to launch a command C1 on a home automation device D1 and a command C2 on a home automation device D2. The central control unit launches the command C1 on the home automation device P1 and sends the result back to the server, then launches the command C2 on the home automation device P2 and sends the result back to the server.

The errors possibly encountered while carrying out the test procedure will serve as a basis for the diagnosis report.

As example, the following errors can be detected:
- A command refused because the home automation device D does not respond or is out of radio range;
- A command refused because the encryption key is no longer the right one; the device has lost the key or has been reset;
- For a rolling shutter-type home automation device: the device refuses the drive command by indicating a thermal protection;
- For a gate shutter-type home automation device: the device refuses the drive command by indicating the detection of an obstacle.

The home automation device D sends back this diagnosis information at a step EDD7. The step EDD7 may therefore correspond in particular to a diagnosis function feedback, either to a command feedback, or to a notification or a consultation of one or several state variable value(s).

The central control unit receives this information at a step EDU7. The central control unit can consolidate the information coming from different home automation devices associated thereto, as well as the information collected during the diagnosis operated during step EDU4, then transmit this information to the management unit Sv at a step EDU8.

The management unit receives this information at a step EDSv8. The management unit can consolidate information coming from different central control units associated to an installation, as well as the information collected during the diagnosis operated during step EDSv2, then establish a diagnosis report transmitted to the maintenance user USAV at a step EDSv9.

The steps described in FIG. 4 correspond to a case in which the communication is possible from the management unit Sv to the central control unit U, and in which diagnosis messages are sent from the management unit to the central control unit U and from the central control unit U to the home automation device(s) D.

In the case where the communication between the management unit Sv and the central control unit U is not possible, in particular if the central control unit U no longer responds or is no longer reachable, the diagnosis can then be based on the last known states or the histories stored at the level of the management unit Sv during step EDSv2. In this case, steps EDSv3, EDSv8 and the intermediate steps on the central control unit U and the home automation device D are not carried out.

In the same way, if the communication between the central control unit U and a home automation device is not possible, in particular if the home automation device U no longer responds or is no longer reachable, the diagnosis can then be based on the last known states or the histories stored at the level of the central control unit Sv during step EDU4. In this case, steps EDU5, EDU7 and the intermediate steps on the home automation device D are not carried out.

As examples, the following diagnosis elements can be determined at the level of the management unit or the central control unit based on the data stored at their level:

a—a sensor-type home automation device communicating by radiofrequency no longer transmits for a determined period of time, for example a few hours. The central control unit determines that the situation is not normal and sends back a state of error on this device to the management unit Sv.

b—The management unit can implement at its level a determination of a history browsing of commands. Thus, the management unit can store all launched commands with a time stamp and their result, in particular with the possible error codes). It is then possible to browse the history of the recent commands to observe the error rate or the apparition of some characteristic error codes.

c—The management unit can implement at its level a determination of a history browsing of the values of state variables: the management unit can store all the values taken by some state variables of the home automation devices or the central control units with a time stamp. It is then possible to browse the history of the states of the home automation devices looking for values indicating a problem. A state variable value may correspond to the quality of the radio signal (RSSI=Received Signal Strength Indication): if this value is too low or fluctuates over time, it is possible to diagnose a problem of radio range or jamming.

Diagnosis Report

The diagnosis report may in particular comprise the following information:
- information on the communication with the central control unit, and the connectivity between the management unit and the central control unit, or between the central control unit and each concerned device, and in particular the existence of a connection or its absence; This information can also comprise:

The quality of the transmission between the elements;
The intervals without communication,
To the extent that the communication is possible, the report may also comprise:
The last known states and the last known values of the state variables for the home automation devices and for the central control units;
A history of the incidents IO; as example, the logging difficulties of the user can be reported, by indicating, for example, failed attempts to enter a login/password;
A history of updates of the embedded software/indicating whether these updates were performed correctly;
A history of the actions by the end user UsrF, or by an automatism, with an execution result/The last observed defects;
The report may also comprise:
An analysis of the history, and/or
A proposal for a resolution procedure.

The analysis of the history and the resolution procedure proposals may use different criteria depending on the nature of the considered history.

According to a first possibility, in the case of an analysis of the history of the connection incidents, the latter is performed based on the error codes stored during the unsuccessful access attempts, among the following types:
invalid password;
password blocked due to too many trials;
remote network address blocked due to too many trials;
network address(es) at the origin of these attempts.

The nature of the blocking can thus be determined, in particular among the following possibilities: invalid password, password blocked by the user himself or by fraudulent access attempts.

The possible resolution procedures consist of unblocking the password and/or the remote network address, or proposing the user to change the password by a recovery procedure using several mechanisms in particular among the following possibilities: sending a request for validation by another media (email, sms, . . . ), request for responding to a secret question.

According to a second possibility, in the case of an analysis of the history of the actions by the end user UsrF, or by an automatism, with an execution result, the latter is performed based on the error codes stored in the execution results.

Depending on the encountered error code, a resolution procedure can be determined in particular by one of the following methods:
If the error code is explicit (that is to say it directly indicates the nature of the problem), a resolution procedure can be uniquely determined in a local knowledge base at the management unit from the error code. The typical examples of this case concern errors such as low battery, invalid security key, obstacle blocking.
If the error code is generic (that is to say, it indicates a category of problem without specifying the exact nature thereof), one or several resolution procedure(s) can be determined using a local knowledge base at the management unit from the error code, the type of home automation device and the following elements, if these are available:
the serial number of the home automation device
the hardware or software version of the home automation device
the date of manufacture of the home automation device The typical examples of such cases concern unexpected type errors on a particular type of rolling shutter and a certain year of production.

The possible resolution procedures are multiple: physical setting of the home automation device by a technician where necessary, update of the software of the home automation device where possible, replacement of the home automation device if the series is known as defective, . . .
If the error code indicates an absence of communication with the home automation device, a resolution procedure may be proposed, including in particular:
a battery check-up, for the home automation devices operating on a standalone battery;
a check-up of the range for the home automation devices using a radiofrequency communication protocol
a check-up of the wiring for the home automation devices using a wired communication protocol;
An example of such an error may be an error indicating an absence of communication with the home automation device for more than 4 hours.

A statistical analysis of the error occurrences per home automation device, performed over a larger horizon, can also allow determining whether a home automation device has recurring defects over time, and proposing a possible replacement of the home automation device.

According to a third possibility, in the case of an analysis of the history of the events on the management unit, this is carried out based on the received event codes.
These events may relate to:
incidents detected at the level of the central control unit U. As example, such an incident may correspond to the detection of a radio jamming;
incidents sent back in an event-driven manner by the home automation devices. For example, such an incident may correspond to a «low cell or battery»type defect or to a detection of excessive wind gusts by a wind sensor.

Resolution/Maintenance
Manual Resolution by the User
Based on the Diagnosis Report, according to a first possibility, a proposal for a resolution procedure may involve an action of the end user.
In this case, at a step ERUSAV1, the maintenance user requests the user to proceed with a corrective action.
Alternatively, the proposal may consist of an ascending procedure, at a step ERUSAV2, to an expert maintenance user USAVex who can himself guide the end user, at a step ERUSAVex3.

Complementary Tests/Update Command
Based on the Diagnosis Report, according to a second possibility, a technical test action or else a forced update command may be recommended.
Thus, at a first step ERUSAV1', the maintenance user USAV requests a consultation of the installation, a central control unit or a home automation device D for which he has a temporary authorization.
This request is received by the management unit Sv at a step ERSv1'.
The management unit initiates a first test step ER'Sv2 based on the information available at its level. For example: Have the most recent software updates been performed?
The management unit Sv can also send, at a step ERSv3' a technical test action request message or a command to a central control unit U, that the central control unit receives at a step ERU3'.
The central control unit U launches a test step ERU4' based on the information available at its level or on command. For example: Has the last update been installed? If not, download and installation of the update.

The central control unit Sv can also send, at a step ERU5' a test request message or a control order to a device D, that the device D receives at a step ERD5'.

The home automation device U launches a diagnosis step ERD6' based on the information available at its level. For example: Has the last update been installed? If not, download and installation of the update.

The home automation device U returns this test information or the result of the command at a step ERD7'.

The central control unit receives this information at a step ERU7'. The central control unit can consolidate the information coming from different home automation devices associated thereto, as well as the information collected during the test or the command operated during step ERU4', then transmit this information to the management unit Sv at a step ERU8'.

The management unit receives this information at a step ERSv8'. The management unit can consolidate the information coming from different central control units associated to an installation, as well as the information collected during the test or the command operated during step ERSv2', then establish a test or control report transmitted to the maintenance user USAV at a step ERSv9'.

Resolution by a Third-Party System

According to a third possibility, based on the diagnosis report or the additional tests, it is possible that a problem is detected on a central control unit U or a home automation device D.

In this case, at a step ERSv1", the server determines the third-party system responsible for the central control unit or the defective device (it may be the management unit Sv).

At a step ERST2", a ticket TKST is opened on the third-party system ST, on request of the management unit Sv.

Intermediate statuses may be received from the third-party system ST.

The feedback of the ticket is received at a step ERSv3", the closure of the ticket TK may intervene if the ticket TKST indicates a resolution at a step Ersv4".

Statistics on the origin of errors per partner can be kept.

All operations are recorded in the ticket TK to allow the recovery by another person.

The invention claimed is:

1. A method for managing an incident in at least one home automation installation comprising at least one home automation device and at least one central control unit, the method being implemented by a management unit remotely connected to the at least one home automation installation, via a wide area network, and comprising the following steps:
   a step (EDSv1) of receiving a diagnosis request concerning the at least one central control unit belonging to the at least one home automation installation or the at least one home automation device belonging to the at least one home automation installation;
   a step (EDSv3) of sending at least one diagnosis query message to the at least one central control unit concerned by the diagnosis request or to the at least one central control unit to which the at least one home automation device concerned by the diagnosis request is related;
   a step (EDSv8) of receiving a diagnosis result coming from the at least one central control unit;
   a step (EDSv9) of providing a diagnosis report to a maintenance user in charge of responding to at least one query from an end user, the diagnosis report being established based on the at least one diagnosis result;
   the at least one diagnosis result comprising:
   at least one connectivity state information concerning remote network between the management unit on the one hand and the home automation device or the at least one central control unit concerned by the diagnosis request on the other hand, the at least one connectivity state information indicating an existence and an absence of a remote connection between the management unit on the one hand and the home automation device or the at least one central control unit concerned by the diagnosis request on the other hand and, in the case of the existence of the remote connection, the at least one connectivity state information further indicating a quality level of the remote connection and
   to the extent that the home automation device or the at least one central control unit can communicate such a result:
   at least one known value of at least one state variable of the at least one home automation device and/or of the at least one central control unit; and
   at least one control or connection attempt result at the initiative of the end user.

2. The method according to claim 1, comprising a prior step (EASv2) of receiving an incident management request coming from the end user of the at least one home automation installation or the maintenance user.

3. The method according to claim 2, comprising a step (EASv3) of determining a user profile corresponding to the end user.

4. The method according to claim 3, comprising a step (Easv4) of determining the at least one home automation installation and/or the at least one central unit or the at least one home automation device related to a user profile corresponding to the end user.

5. The method according to claim 4, comprising a step (EASv6) of verifying the access rights of a maintenance user on the at least one home automation installation, the at least one central control unit or the at least one home automation device.

6. The method according to claim 5, comprising a step (EASv8) of sending a request for authorization of temporary access right to the at least one home automation installation, to the at least one central control unit or to the at least one home automation device to the end user for the benefit of the management unit or the maintenance user, and a step (EASv9) of receiving a response to the request for authorization of access right.

7. The method according to claim 1, comprising a step (EASv3) of determining a user profile corresponding to the end user.

8. The method according to claim 1, comprising a step (EAsv4) of determining the at least one home automation installation and/or the at least one central unit or the at least one home automation device related to a user profile corresponding to the end user.

9. The method according to claim 1, comprising a step (EASv6) of verifying the access rights of a maintenance user on the at least one home automation installation, the at least one central control unit or the at least one home automation device.

10. The method according to claim 1, comprising a step (EASv8) of sending a request for authorization of temporary access right to the at least one home automation installation, to the at least one central control unit or to the at least one home automation device to the end user for the benefit of the management unit or the maintenance user, and a step (EASv9) of receiving a response to the request for authorization of access right.

11. The method according to claim 1, further comprising carrying out a step (EDSv2) of local diagnosis on the management unit.

12. The method according to claim 11, wherein the step of providing a diagnosis report comprises carrying out a combination between a result of the local diagnosis step and a result of diagnosis coming from the at least one central control unit.

13. The method according to claim 1, comprising a step (ERUSAV2) of sending an ascending message to an expert maintenance user.

14. The method according to claim 1, comprising:
   a step (EDSv1') of receiving a control request concerning the at least one central control unit belonging to the at least one home automation installation or the at least one home automation device belonging to the at least one home automation installation;
   a step (ERSv2') of local test based on the information available at the level of the management unit;
   a step (ERSv3') of sending at least one control request message to the at least one central control unit concerned by the at least one control request message or to the at least one central control unit to which the at least one home automation device concerned by the at least one control request message is related;
   a step (ERSv8') of receiving a control result coming from a central control unit;
   a step (ERSv9') of providing a control report, in connection with an incident ticket to the maintenance user established based on the at least one control result.

15. The method according to claim 1, further comprising carrying out a step (ERSv2') of local control on the management unit.

16. The method according to claim 14, wherein the control corresponds to an update of a software embedded on the at least one home automation device or the at least one central control unit concerned by the control request.

17. A method for managing an incident in at least one home automation installation comprising at least one home automation device and at least one central control unit, the method being implemented by a management unit remotely connected to the at least one home automation installation, via a wide area network, and comprising the following steps:
   a step (EDSv1) of receiving a diagnosis request concerning the at least one central control unit belonging to the at least one home automation installation or the at least one home automation device belonging to the at least one home automation installation;
   a step (EDSv3) of sending at least one diagnosis query message to the at least one central control unit concerned by the diagnosis request or to the at least one central control unit (U) to which the at least one home automation device concerned by the diagnosis request is related;
   a step (EDSv8) of receiving a least one diagnosis result coming from the at least one central control unit (U);
   a step (EDSv9) of providing a diagnosis report to a maintenance user in charge of responding to at least one query from an end user, the diagnosis report being established based on the at least one diagnosis result;
   the at least one diagnosis result comprising:
   at least one connectivity state information concerning remote network connection between the management unit on the one hand and the at least one home automation device or the at least one central control unit concerned by the diagnosis request on the other hand, the at least one connectivity state information indicating an existence and an absence of a remote connection between the management unit on the one hand and the home automation device or the central control unit concerned by the diagnosis request on the other hand and, in the case of the existence of the remote connection, said connectivity state information further indicating a quality level of the remote connection and
   to the extent that the at least one home automation device or the at least one central control unit can communicate such a result:
   at least one known value of at least one state variable of the at least one home automation device and/or of the at least one central control unit; and
   at least one control or connection attempt result at the initiative of the end user;
   a step (ERSv1") of determining a third-party system associated to the incident management of the at least one central control unit or the at least one home automation device concerned by the incident management request;
   a step (ERST2") of sending a query for opening a third-party ticket by the third-party system; and
   a step (ERSv3") of receiving a feedback concerning the third-party ticket.

18. A method for incident management of at least one home automation installation comprising at least one home automation device and at least one central control unit comprising a module for communication with a management unit remotely connected to the at least one home automation installation via a wide area network, the method being implemented by the at least one central control unit and comprising the following steps:
   a step (EDU3) of receiving a diagnosis request coming from the management unit, concerning the at least one central control unit or the at least one home automation device related to the at least one central control unit;
   a step (EDU5) of sending at least one diagnosis query message to the at least one home automation device concerned by the diagnosis request;
   a step (EDU7) of receiving at least a diagnosis result coming from the at least one home automation device concerned by the diagnosis request; and
   a step (EDU8) of providing a diagnosis report, the diagnosis report being established based on the diagnosis result and the diagnosis result comprising:
   at least one connectivity state information concerning remote network connection between the management unit on the one hand and the at least one home automation device or the at least one central control unit concerned by the diagnosis request on the other hand, the at least one connectivity state information indicating an existence and an absence of a remote connection between the management unit on the one hand and the at least one home automation device or the at least one central control unit concerned by the diagnosis request on the other hand and, in the case of the existence of the remote connection, the at least one connectivity state information further indicating a quality level of the remote connection and
   to the extent that the at least one home automation device or the central control unit can communicate such a result:

at least one control or connection attempt result at the initiative of the end user and at least one known value of at least one state variable of the at least one home automation device and of the at least one central control unit.

19. The method according to claim 18, comprising the following steps:

a step (ERU3') of receiving a control request coming from the management unit (Sv), concerning the at least one central control unit or the at least one home automation device related to the at least one central control unit;

a step (ERU5') of sending at least one control query message to the at least one home automation device concerned by the diagnosis request;

a step (ERU7') of receiving a control result coming from the at least one central control unit (U);

a step (ERU8') of providing a control report.

* * * * *